United States Patent [19]
Murata et al.

[11] Patent Number: 5,603,396
[45] Date of Patent: Feb. 18, 1997

[54] CLUTCH DEVICE FOR AN AUTOMATIC TRANSMISSION

[75] Inventors: Kiyohito Murata, Susono; Yoshio Shindo, Numazu, both of Japan

[73] Assignee: Toyota Jidosha Kabushiki Kaisha, Toyota, Japan

[21] Appl. No.: 405,892

[22] Filed: Mar. 17, 1995

[30] Foreign Application Priority Data

Mar. 18, 1994 [JP] Japan .................................. 6-048806

[51] Int. Cl.⁶ ........................................ F16D 25/063
[52] U.S. Cl. .................................. 192/85 AA; 192/52.5; 192/54.3; 192/54.52
[58] Field of Search ................................. 192/52.5, 54.3, 192/54.52, 85 AA, 93 A, 70.23, 35; 188/72.2

[56] References Cited

U.S. PATENT DOCUMENTS

| 2,827,994 | 3/1958 | Tiedeman et al. | |
|---|---|---|---|
| 3,199,374 | 8/1965 | O'Malley et al. | |
| 3,674,118 | 7/1972 | Klaue | 192/54.3 X |
| 3,688,882 | 9/1972 | O'Malley | 192/54.3 X |
| 3,717,229 | 2/1973 | Perlick . | |
| 3,733,920 | 5/1973 | Annis . | |
| 5,031,746 | 7/1991 | Koivunen . | |
| 5,036,963 | 8/1991 | Murata | 192/35 |
| 5,070,975 | 12/1991 | Tanaka et al. | 192/35 |
| 5,106,348 | 4/1992 | Koivunen . | |
| 5,464,084 | 11/1995 | Aoki et al. . | |

FOREIGN PATENT DOCUMENTS

| 0409610 | 1/1991 | European Pat. Off. . | |
|---|---|---|---|
| 953857 | 12/1956 | Germany . | |
| 3620924 | 1/1988 | Germany . | |
| 2-66328 | 3/1990 | Japan | 192/70.23 |
| 2-69134 | 5/1990 | Japan . | |
| 1149573 | 4/1969 | United Kingdom . | |
| 2251465 | 7/1992 | United Kingdom | 192/70.23 |

OTHER PUBLICATIONS

The Multi–Mode Clutch—A New Technology for Free-wheeler Shifting Automatic Transmissions, SEA Paper No. 930911, Erikki Koivunen, pp. 181–194.

*Primary Examiner*—Rodney H. Bonck
*Attorney, Agent, or Firm*—Oblon, Spivak, McClelland, Maier & Neustadt, P.C.

[57] ABSTRACT

A clutch device, having a cam mechanism between a piston member and clutch discs, which has a high torque transmitting capacity, small dimensions and no engagement shock is provided. The clutch device comprises a pair of members which are spaced on a common axis and relatively rotate around a common axis, a variable length coupling member which is disposed on the common axis between the relatively rotating members and is composed of a pair of cam members, and a piston member which selectively pushes the variable length coupling member toward one of the relatively rotating members to cause a frictional engagement between one end of the variable length coupling member and one of the relatively rotating members. The variable length coupling member is elongated through the agency of a reaction between the cam members after a frictional engagement between one end of the variable length coupling member and one of the relatively rotating members caused by the piston member so that the relatively rotating members are engaged to each other by a force proportional to a transmitting torque input from one of the relatively rotating members.

15 Claims, 9 Drawing Sheets

Fig.2

| RANGE | GEAR | $C_1$ | $C_2$ | $C_3$ | $B_1$ | $B_2$ | $B_3$ | $B_4$ | $F_1$ | $F_2$ | $F_3$ |
|---|---|---|---|---|---|---|---|---|---|---|---|
| P | (PARKING) | | | ON | | | | | | | |
| R | (REVERSE) | | ON | ON | | | ON | | | | |
| N | (NEUTRAL) | | | ON | | | | | | | |
| D | O/D | ON | ON | | | ON | | ON | | | |
| D | THIRD | ON | ON | ON | | ON | | | | | ON |
| D | SECOND | ON | | ON | | ON | | | ON | | ON |
| D | FIRST | ON | | ON | | | | | | ON | ON |
| 2 | SECOND | ON | | | ON | ON | | | ON | | ON |
| 2 | FIRST | ON | | ON | | | | | | ON | ON |
| L | FIRST | ON | | ON | | | ON | | | ON | ON |

Fig.3a
Fig.3b
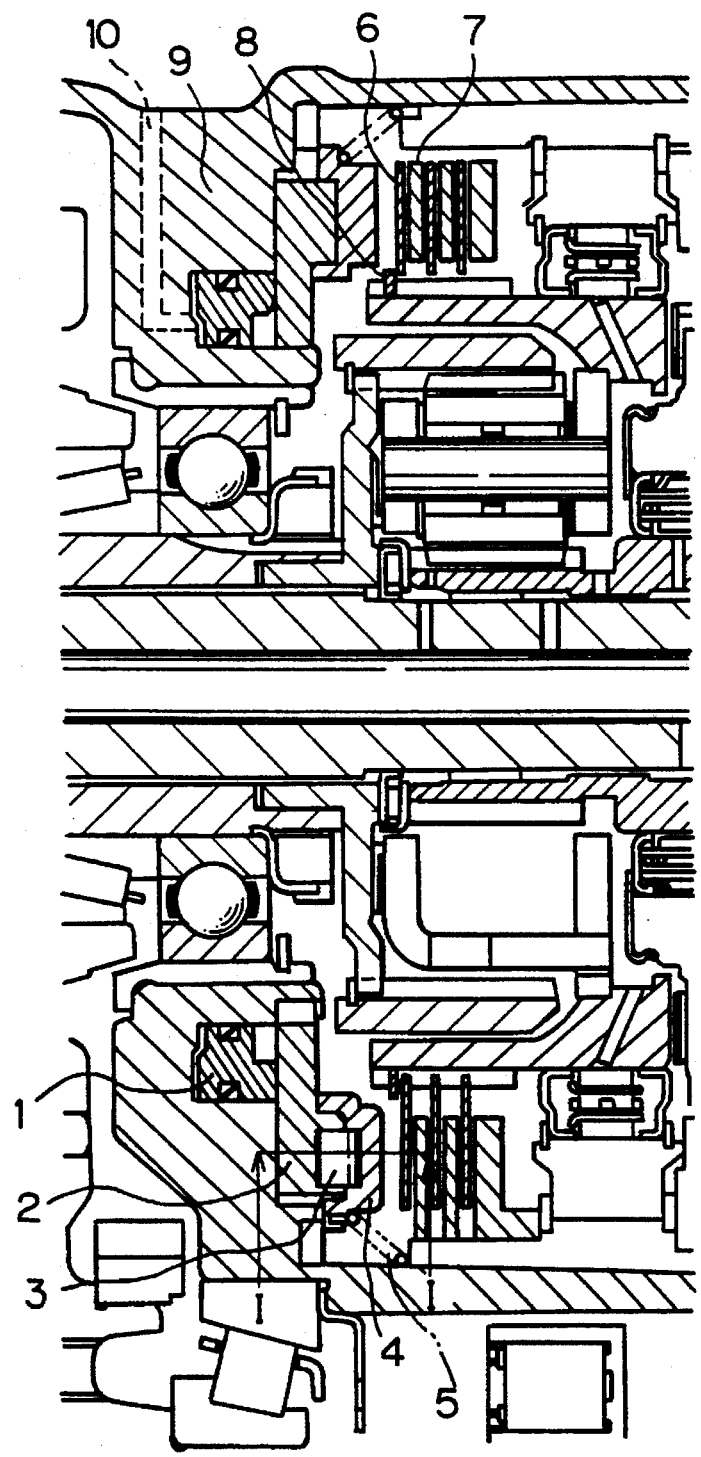
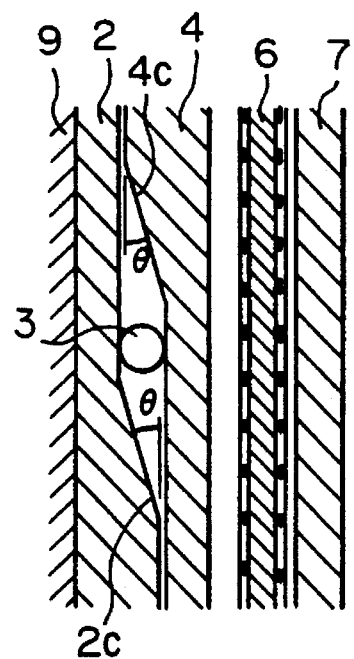

CLUTCH DEVICE FOR AN AUTOMATIC TRANSMISSION

BACKGROUND OF THE INVENTION

1. Field of the Invention

The present invention relates to a clutch device used in an automatic transmission for an automobile.

2. Description of the Related Art

In an automatic transmission used in an automobile, a multiple disc wet-type clutch device, comprising plural clutch discs and separator plates which are engaged with each other by the pushing force of a piston which is driven by oil pressure, is commonly used.

In such a type of clutch device, it is necessary to increase the oil pressure or to increase the number of clutch discs and separator plates to attain higher torque transmitting capacity.

However, it is impossible to attain an oil pressure which is higher than line pressure which is generated by an oil pump, and it causes an increase of axial length if the number of clutch discs and separator plates is increased.

Therefore, a clutch device which is provided with a cam mechanism between the piston and one of clutch disc or separator plates has been developed (Japanese Unexamined Utility Model Publication (KOKAI) No. 2-69134).

In the above type of clutch, cam members are separated when the piston begins the operation, so that clutch and separator plates are suddenly engaged and this causes a shock.

SUMMARY OF THE INVENTION

Therefore, an object of the present invention is to provide a clutch having high torque transmitting capacity with no increase in the axial length nor a shock at engagement.

According to the present invention there is provided a clutch device which comprises a pair of members distanced on common axis and relatively rotating around the common axis, a variable length coupling means disposed on the common axis between the relatively rotating members and composed of a pair of cam members, a piston means selectively pushing the variable length coupling means toward one of the relatively rotating members to cause a frictional engagement between one end of the variable length coupling means and one of the relatively rotating members. The variable length coupling means is elongated after a frictional engagement between one end of the variable length coupling means and one of the relatively rotating members, caused by the piston means, through the agency of a reaction between the cam members. Then the relatively rotating members are engaged with each other by a force proportional to a transmitting torque which is input from one of the relatively rotating members.

The present invention will be more fully understood from the description of preferred embodiments of the invention, as set forth below, together with the accompanying drawings.

BRIEF DESCRIPTION OF THE DRAWINGS

In the drawings:

FIG. 2 is a chart showing the combination of the devices to be engaged at each range and gear speed in the transmission of FIG. 1;

FIG. 3a is a sectional view of the first embodiment applied to the third brake $B_3$ in FIG. 1 in a disengaged condition with no oil pressure supplied;

FIG. 3b is a sectional view taken along the line I—I of FIG. 3a;

FIG. 4b is a partial sectional view taken along the line II—II of FIG. 4a;

FIG. 5b is a partial sectional view taken along the line III—III of FIG. 5a;

FIG. 7b is a partial sectional view taken along the line IV—IV of FIG. 7a;

FIG. 8b is a partial sectional view taken along the line V—V of FIG. 8a;

FIG. 9b is a sectional view taken along the line VI—VI of FIG. 9a;

FIG. 10b is a partial sectional view taken along the line VII—VII Of FIG. 10a.

DESCRIPTION OF THE PREFERRED EMBODIMENTS

Figure 1:
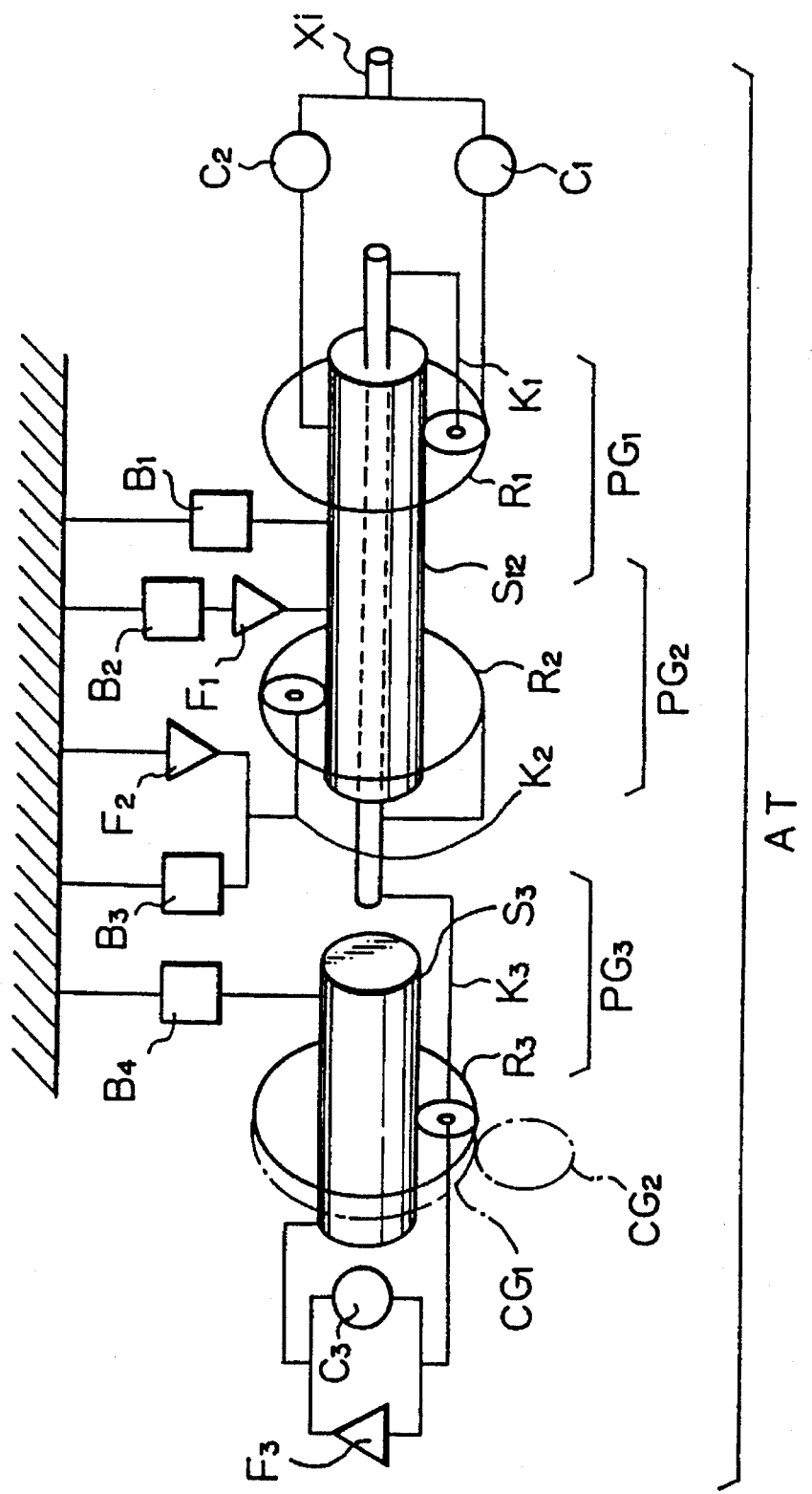
FIG. 1 is a schematic diagram of the automatic transmission having four speeds forward and one speed reverse.

In FIG. 1, AT generally represents an automatic transmission which comprises three sets of planetary gear units and plural frictional engagement devices to change operating conditions of the ring gears, sun gears and carriers which compose the planetary gear units.

$X_i$ represents an input shaft and is connected with an output shaft of a torque converter (not shown).

$PG_1$, $PG_2$ and $PG_3$ represent a front planetary gear unit, a rear planetary gear unit and an O/D planetary gear unit respectively.

$R_1$, $R_2$ and $R_3$ represent a front planetary ring gear, a rear planetary ring gear and an O/D planetary ring gear respectively.

$K_1$, $K_2$ and $K_3$ represent a front planetary carrier, a rear planetary carrier and an O/D planetary carrier respectively.

$S_{12}$ represents a front and rear planetary sun gear and $S_3$ represents an O/D planetary sun gear.

$C_1$ represents a first clutch which engages the input shaft $X_i$ and the front planetary ring gear $R_1$.

$C_2$ represents a second clutch which engages the input shaft $X_i$ and the front and rear planetary sun gear $S_{12}$.

$C_3$ represents a third clutch which engages the O/D planetary carrier $K_3$ and the O/D planetary sun gear $S_3$.

$B_1$ represents a first brake which locks the clockwise and counterclockwise revolution of the front and rear planetary sun gear $S_{12}$.

$B_2$ represents a second brake, which locks the counterclockwise revolution of the front and rear planetary sun gear $S_{12}$.

$B_3$ represents a third brake which locks the clockwise and counterclockwise revolution of the rear planetary carrier $K_3$.

$B_4$ represents a fourth brake, which locks the clockwise and counterclockwise revolution of the rear planetary carrier $K_3$.

$F_1$ represents a first one-way clutch which locks the counterclockwise revolution of the front and rear planetary sun gear $S_{12}$.

$F_2$ represents a second one-way clutch which locks the counterclockwise revolution of the front and rear planetary sun gear $S_{12}$.

$F_3$ represents a third one-way clutch which locks the counterclockwise revolution of the O/D planetary carrier in relation to O/D sun gear $S_3$.

$CG_1$ and $CG_2$ respectively represents a counter drive gear and a counter driven gear for transmitting the engine torque which were changed its rotation speed to a drive pinion which is an output shaft of the automatic transmission.

As shown in FIG. 2, for example, to attain the first gear speed in the L range, the first clutch $C_1$, the third clutch $C_3$, the third brake $B_3$, the second one-way clutch $F_2$ and the third one-way clutch $F_3$ should be engaged.

FIG. 3a to FIG. 5b concern the first embodiment which embodies the third brake $B_3$ of the automatic transmission AT shown in FIG. 1.

In FIG. 3a, reference numeral 1 represents a piston. The piston 1 selectively pushes a first cam member 2, a second cam member 4, and a cam roller 3 located between the first cam member 2 and the second cam member 4. A spring 5 always pushes the first cam member 2 and the second cam member 4 including the cam roller 3, to the left of the figure.

Reference numerals 6 and 7 respectively represent clutch discs and separator plates which are selectively engaged with each other. A snap ring 8 limits the movement of the clutch discs 6 to the left and prevents the clutch discs 6 from contacting with the second cam member 4 and interfering with the operation of the cam member 4. A clutch casing 9 has a recess (with no reference numeral) in which piston 1 moves, and has an oil passage 10 to supply oil pressure to the piston 1.

As shown in FIG. 3b, a cam face 2c and a cam face 4c are respectively formed on the axial end surfaces of the cam member 2 and the cam member 4. The cam face 2c and the cam face 4c respectively contact the cam roller 3. The cam angles θ of the cam face 2c and the cam face 4c are defined to satisfy tan θ<μ, where μ means the coefficient of friction between the second cam member 4 and the clutch disc 6.

FIGS. 3a and 3b show a condition with no oil pressure supplied and the first cam member 2 and the second cam member 4, including cam roller 3, being forced to the left end position by spring 5, so that the second cam member 4 and clutch disc 6 are separated and torque transmission is not carried out.

Figure 4A:
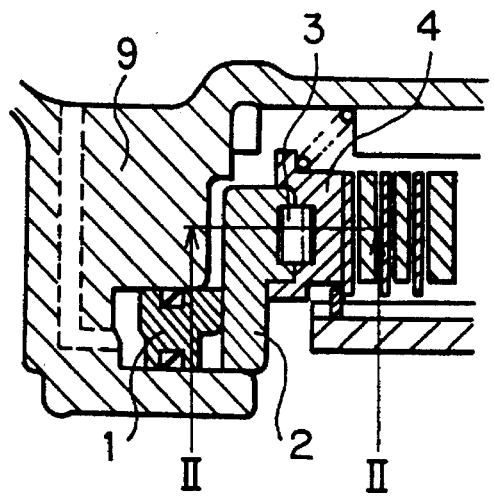
FIG. 4a is a partial sectional view of the first embodiment with the piston pushing cam members fully to the right.
Figure 4B:
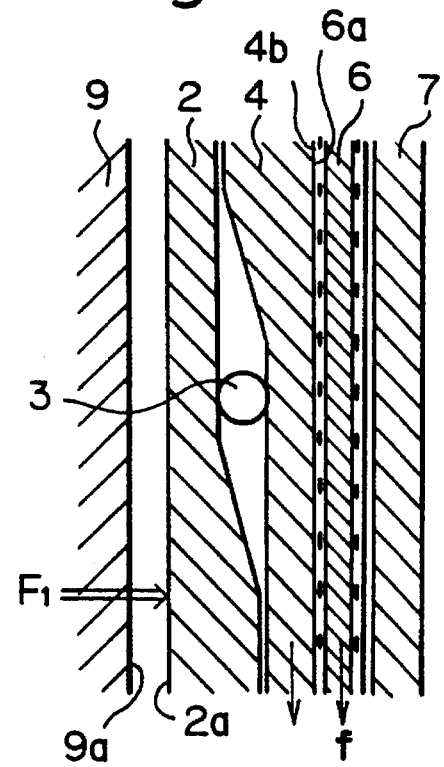

When oil pressure is supplied to the back side of the piston 1, as shown in FIGS. 4a and 4b, the first cam member 2 and the second cam member 4, including the cam roller 3, are pushed to the right by the piston 1 so that, in due course, the back side 4b of the second cam member 4 and a frictional surface 6a of the clutch disc 6 begin to engage to each other. Then, the second cam member 4 is dragged by the clutch disc 6 and begins to rotate in the same direction as the clutch disc 6.

In due course, the cam face 4c of the second cam member 4 begins to climb the cam surface 2c of the second cam member 2 through the cam roller 3, so that a force which tends to push the first cam member 2 to the left, and to push the second cam member 4 to the right, is generated. The force increases the distance between the first cam member 2 and the second cam member 4.

Then, the back surface 2a of the first cam member contacts the cam receiving surface 9a of the clutch housing 9, so that the first cam member 2 stops moving.

Figure 5A:
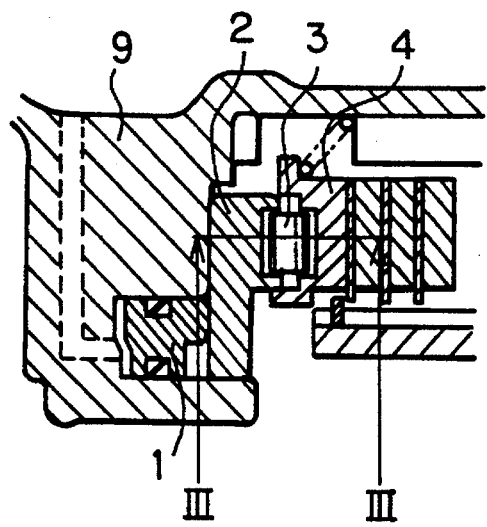
FIG. 5a is a partial sectional view of the first embodiment with the cam members generating reaction force.
Figure 5B:
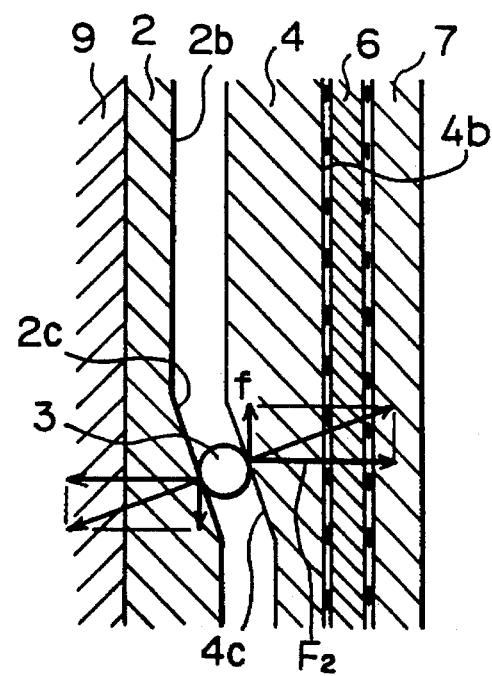

Therefore, a force generated by the further revolution of the second cam member 4 only pushes the second cam member 4 to the right, so that the engagement force between the clutch disc 6 and the separator plate 7 becomes stronger. As a result, the clutch disc 6 and the separator plate 7 are completely engaged, as shown in FIG. 5a and FIG. 5b.

Herein, forces generated and acting in the operation are described.

A frictional force f between the second cam member 4 and the clutch disc 6, as shown in FIG. 4b, is described as follows;

$$f = \mu \times F_1 \qquad (1)$$

where, f: frictional force between the second cam member 4 and the clutch disc 6.

μ: coefficient of friction between the second cam member 4 and the clutch disc 6.

$F_1$: a force of the piston 1 which pushes the first cam member 2 and the second cam member 4, including the cam roller 3, to the right.

A force $F_2$ on the second cam member 4 which pushes the first cam member 2 toward the clutch casing 9 is described below;

$$F_2 = f/\tan\theta \qquad (2)$$

where,

θ: cam angle

Therefore, a force of $F_2-F_1$ acts on the first cam member 2.

Here, $F_2-F_1=f/\tan\theta-f/\mu$, because $F_1=f/\mu$ from equation (1), and $F_2=f/\tan\theta$ from equation (2).

As μ is previously set greater than tan μ, therefore $F_2-F_1>0$.

Thus, the first cam member 2 is pushed toward the clutch casing 9, and finally the first cam member 2 contacts the cam receiving surface 9a of the clutch casing 9 and is stopped.

After the first cam member 2 contacts the cam receiving surface 9a of the clutch casing 9, only $F_2$ acts on the clutch disc 6 through the cam roller 3 and the second cam member 4, as shown in FIG. 5b.

On the other hand, f=T/r, where T is transmitting torque, and r is an average radius from rotating center to the acting surface.

Therefore, the force $F_2$ is proportional to the transmitting torque.

Thus, the clutch casing 9 and the clutch disc 6 which serve as relatively rotating members in the present invention are connected by a force which is proportional to the transmitted torque.

Figure 11:
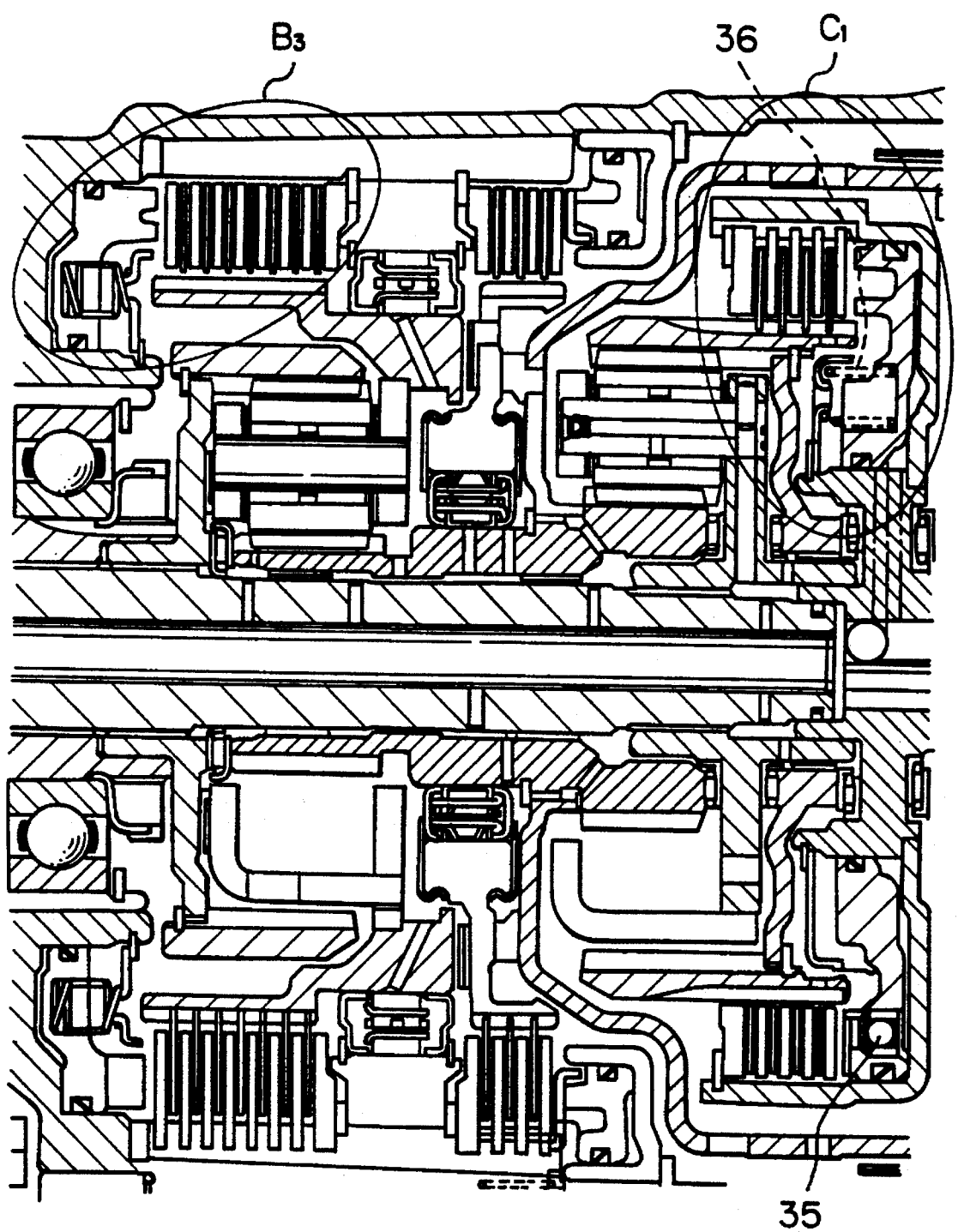
FIG. 11 is a sectional view of a prior art.

As described above, according to the first embodiment of the present invention, a strong pushing force can be attained, therefore the number of clutch discs can be reduced while attaining the same torque transmitting capacity. For example, in the first embodiment only three clutch discs are used instead of the seven clutch discs used in the prior art which is shown in FIG. 11. Further, it is possible to use only one clutch disc, if the clutch disc has a sufficient durability Also, at the beginning of the engagement, the transmitting torque is limited by the pushing force $F_1$, and the piston 1 acts as a shock absorber, so that the shock at engagement is reduced.

After the completion of the engagement, the oil pressure can be relieved, because the transmitting torque acts as a pushing force.

Disengagement is attained only by reversing the direction of the torque. When the direction of the torque is reversed, the cam is released and returns to the condition shown in FIGS. 4a, 4b then to the condition shown in FIGS. 3a, 3b and finally disengages completely.

Figure 6:
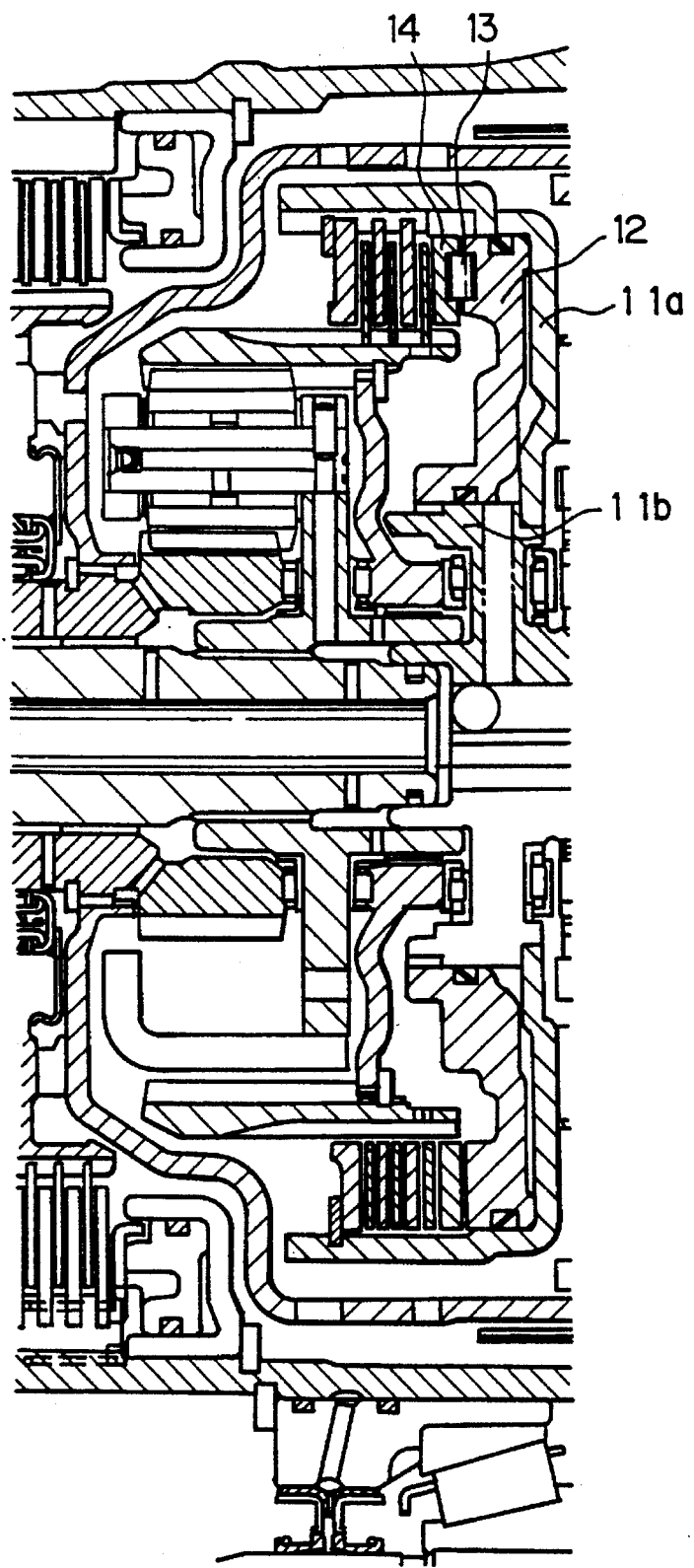
FIG. 6 is a sectional view of the second embodiment applied to the first clutch $C_1$ in FIG. 1 in a disengaged condition with no oil pressure supplied.

FIG. 6 shows the second embodiment of the present invention which is applied to the first clutch $C_1$ of the automatic transmission shown in FIG. 1.

As shown in FIG. 6, in the second embodiment, the clutch housing is separated into two parts, an upper clutch housing 11a and a lower clutch housing 11b. In the second embodiment the piston part and the first cam member part are combined and form a united piston with first cam 12, which is splined to the lower clutch housing 11b. Reference numerals 13 and 14 respectively represent a cam roller and the second cam member.

The above constructed second embodiment operates the same as the first embodiment, so that no detailed description of its operation is provided.

In an engaged condition, the piston with the first cam 12 is returned by the cam force, therefore, the check balls 35 and the return spring 36, which are used in the prior art shown in FIG. 11, are not necessary.

FIG. 7a to FIG. 9b concern the third embodiment of the present invention, which of relates to the third brake $B_3$ of the automatic transmission AT shown in FIG. 1.

Figure 7A:
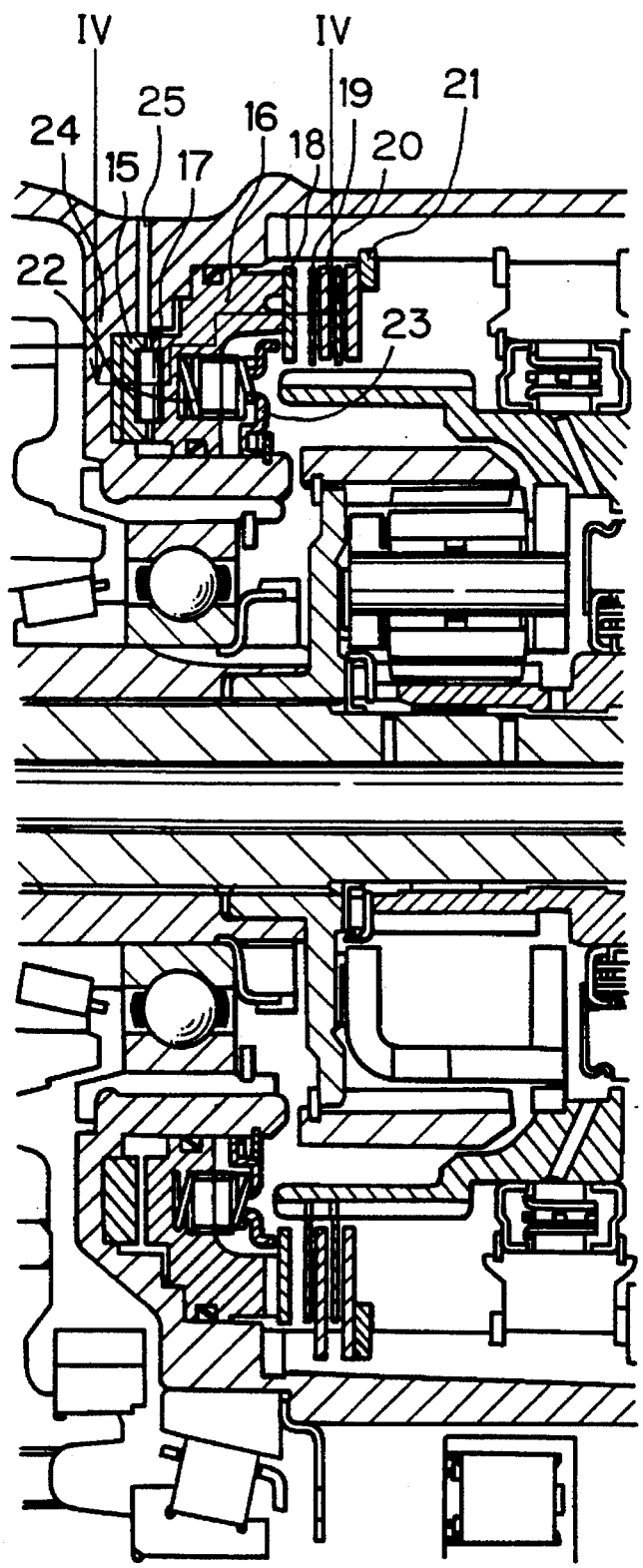
FIG. 7a is a sectional view of the third embodiment applied to the third brake $B_3$ in FIG. 1 in a disengaged condition with no oil pressure supplied.

In FIG. 7a, reference numeral 15 represents a first cam member, 16 represents a piston with the second cam member which is a united combination of a piston and the second cam member and 17 represents a cam roller. A pressure plate 18 is attached on one end of the piston with the second cam member 16. Clutch discs 19 are splined to a member which is connected to the O/D carrier $K_3$ and separator plates 20 are splined to the outer housing (with no reference numeral). A snap ring 21 limits the movement of the clutch discs 19, and the separator plates 20, to the right. A spring 22 which is supported by a spring stopper 23 always pushes the piston with the second cam member 17 to the left. A clutch casing 24 has an oil passage 25 which supplies oil pressure to the clearance between the first cam member 16 and the piston with the second cam member 17.

Figure 7B:
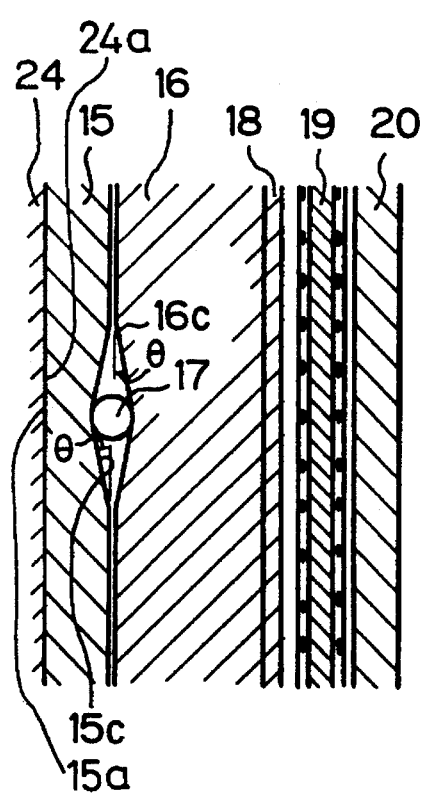

Cam angle θ shown in FIG. 7b is defined to satisfy tan θ>μ, where μ is the coefficient of friction between the pressure plate 18 and the clutch disc 19.

In the condition shown in FIGS. 7a and 7b, no oil pressure is supplied, therefore the first cam member 15 and the piston with the second cam member 17, including the cam roller 16, are forced to the left end position by the spring 22. Accordingly, the pressure plates 18 and clutch discs 19 are separated, and no torque transmission is carried out.

Figure 8A:
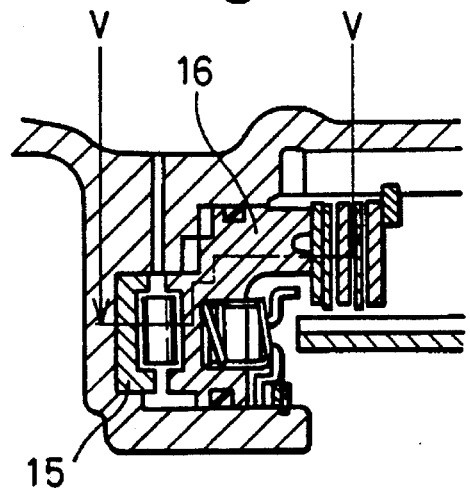
FIG. 8a is a partial sectional view of the third embodiment with the cam members being separated and generating no reaction force.
Figure 8B:
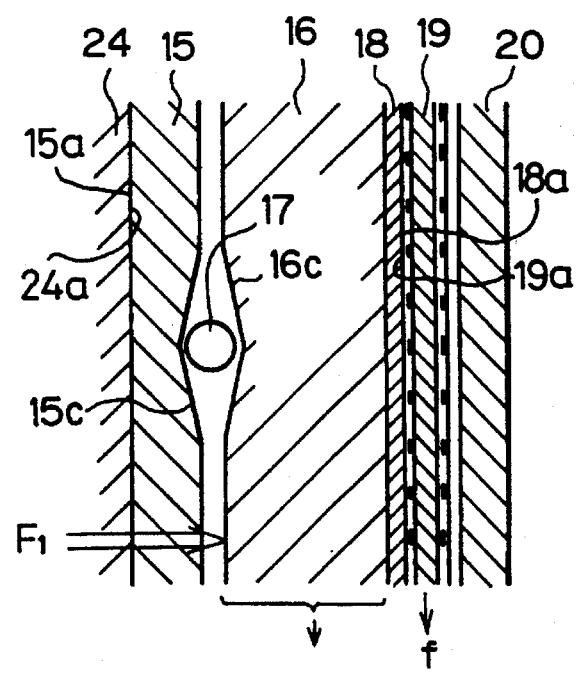

When oil pressure is supplied to the clearance between the first cam member 15 and the piston with the second cam member 16, the piston with the second cam member 16 is pushed to the right, so that, in due course, the pressure surface 18a of the pressure plate 18 and the friction surface 19a at the left end of one of the clutch discs 19 begin to engage, as shown in FIGS. 8a and 8b.

Then, the piston, with second cam member 16, is dragged by the clutch disc 19, and begins to rotate in the same direction as the clutch disc 19.

In due course, the cam face 16c of the piston with second cam member 16 begins to climb the cam surface 15c of the first cam member 15 through the cam roller 17, so that a force which tends to increase the distance between the first cam member 15 and the piston with second cam member 16 is generated.

Figure 9A:
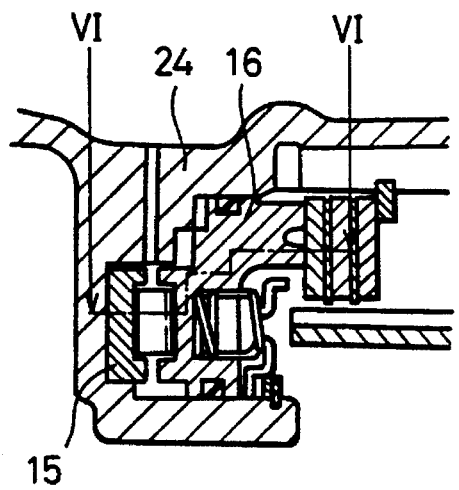
FIG. 9a is a partial sectional view of the third embodiment in an engaged condition with cam members being separated and generating reaction force.
Figure 9B:
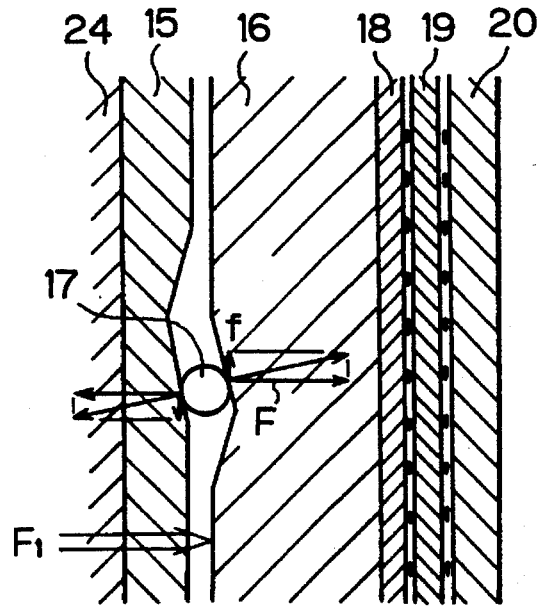

However, the back surface 15a of the first cam member 15 contacts the cam receiving surface 24a of the clutch housing 24. Therefore, the force generated by the further revolution of the piston with second cam member 16 only pushes the piston with second cam member 16 to the right, so that the engagement force between the clutch disc 19 and the separator plate 20 becomes stronger. As a result, the clutch discs 19 and the separator plates 20 are completely engaged, as shown in FIG. 9a and FIG. 9b.

Herein, forces generated and acting in the operation are described.

A frictional force f between the piston with second cam member 16 and the clutch disc 19, generated by a pushing force $F_1$ of piston with the second cam member 16 can be described as follows, as in equation (1).

$$f = \mu \times F_1 \qquad (3)$$

where, f: frictional force between the piston with second cam member 16 and the clutch disc 19.

μ: the coefficient of friction between the piston with second cam member 16 and the clutch disc 19.

$F_1$: a force on the piston with the second cam member 16 which pushes the piston with the second cam member 16 to the right.

Then, a pushing force is generated by the above described friction force, and as a result, the force F with which the pressure plate 18 and the clutch disc 19 engage is described as follows.

$$F = F_1 \times \{1/(1 - \mu/\tan \theta)\} \qquad (4)$$

As shown in the above equation (4), the force F is proportional to the pushing force $F_1$ on the piston with the second cam member 16.

Thus, the clutch casing 24 and the clutch disc 19, which serve as relatively rotating members in the present invention, are connected by a force which is proportional to the pushing force on the piston with the second cam member.

If, μ=0.14, θ=10°, then F=4.85×$F_1$.

This means that the pressure on piston with the second cam member 16 is increased by 4.85 times. Therefore, to attain same torque transmitting capacity, the required number of clutch discs would be 1/4.85 for a conventional type clutch which has no cam mechanism.

Accordingly, instead of the seven clutch discs which are required in the prior art, shown in FIG. 11, two clutch discs are sufficient in the present invention, if μ and θ are set to 0.14 and 10° respectively, as described above.

Also, as in the first embodiment, at the beginning of the engagement, the transmitting torque is limited by the pushing force $F_1$, and the piston 1 acts as a shock absorber, so that the shock at engagement is reduced.

In addition to the above, in the third embodiment, the cam has a V-shaped two-way face, therefore torque can be transmitted regardless of the direction of rotation.

Figure 10A:
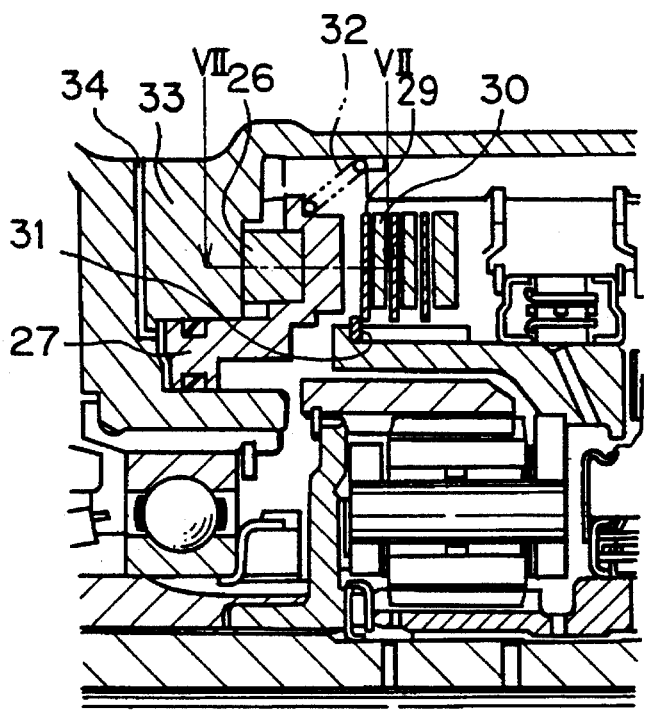
FIG. 10a is a sectional view of the fourth embodiment applied to the third brake $B_3$ in FIG. 1 in a disengaged condition with no oil pressure supplied.
Figure 10B:
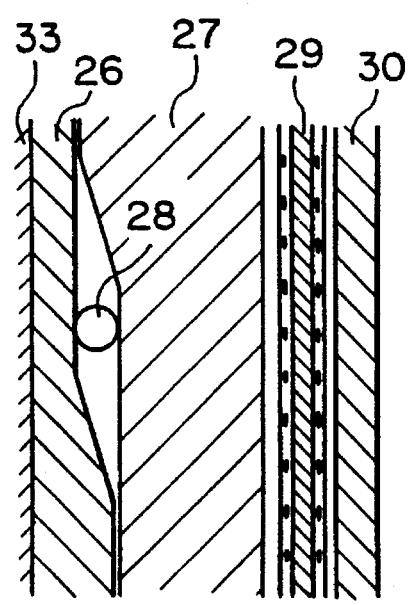

FIGS. 10a and 10b show the fourth embodiment of the present invention, which relates to the third brake $B_3$.

In FIGS. 10a and 10b, reference numerals 26, 27, 28 represent the first cam member, the piston with the second cam member and the cam roller, respectively. The cam face is formed on the surface of the first cam member 26 and on the piston with the second cam member 27 which contacts the cam roller 28. Reference numerals 29 and 30 represent the clutch discs and the separator plates respectively. A snap ring 31 limits the movement of clutch discs 29 and separator plates 30 to the right. A spring 32 always pushes the clutch discs 29 and the separator plates 30 to the left. Reference numeral 33 represents a clutch casing having a recess in which the piston with the second cam member 27 moves. The clutch casing has an oil passage 34 to supply oil pressure to the back surface of the piston with the second cam member 27.

In the condition shown in FIG. 10a and FIG. 10b, no oil pressure is supplied, therefore the first cam member 26, the cam roller 28 and the piston with the second cam member 27 are forced to the left position by the spring 32, and no torque transmission is performed.

The operation of the fourth embodiment is same as the third embodiment, therefore no detailed description is provided.

In the fourth embodiment the cam has a one-way surface and works as a one-way clutch, therefore no torque transmitting is performed when the revolution of the torque is reversed.

Also, in the fourth embodiment, the piston part is located outside of the cam part, so that the section of the piston is reduced and a smooth operation of the one-way clutch is attained.

According to the present invention, a strong engagement force can attained using a cam mechanism, therefore, it is possible to reduce the size of an automatic transmission without reducing the torque transmitting capacity.

Also, a smaller number of the elements composing the frictional engagement device can reduce the friction loss in a disengaged condition and accordingly a better fuel consumption is attainable.

We claim:

1. A clutch device for engaging a pair of relatively rotating members spaced on a common axis having a first frictional engaging element fitted unrotatably and axially movably to one of said relatively rotating members, and a second frictional engaging element fitted unrotatably and axially movably to the other of said relatively rotating members, said clutch device comprising:

a variable length coupling means disposed on said common axis between said relatively rotating members which includes an axially movable first cam member and an axially movable second cam member and a cam roller disposed therebetween; and a piston means which selectively pushes said first cam member and said second cam member therewith to cause a frictional engagement between said second cam member and said second frictional engaging element;

wherein:
said first cam member is arranged to be rotated with said one of said pair of relatively rotating members;
said second cam member is arranged to be rotationally dragged by said other of said pair of rotating members with said frictional engagement between said second cam member and said second frictional engaging element caused by said piston means; and
said first cam member and said second cam member respectively have opposing parallel slanted cam surfaces, of which a cam angle θ is chosen to satisfy tan θ<μ, where μ is a coefficient of friction between said second cam member and said second frictional engaging element, so that said cam roller is positioned between said slanted cam surfaces so as to increase a distance between said first cam member and said second cam member and thereby said first frictional engaging element and said second frictional engaging element are engaged with each other with a force which is proportional to a transmitting torque when said second cam member is rotationally dragged.

2. A clutch device according to claim 1, wherein said piston means is incorporated with one of said cam members.

3. A clutch device according to claim 1, wherein said cam members are located outside of said piston means.

4. A clutch device according to claim 1, wherein said cam surface define V-shaped cam faces so that said relatively rotating members are coupled regardless of the direction of the relative rotation.

5. A clutch device according to claim 1, wherein said first cam member and a piston member of said piston means are integrally formed.

6. A clutch device according to claim 1, wherein an axial movement of said first cam member is blocked when said first cam member itself abuts against said one of said relatively rotating members.

7. A clutch device according to claim 1, wherein an axial movement of said first cam member is blocked through a piston member of said piston means when said piston member itself abuts with said one of said relatively rotating members.

8. A clutch device for engaging a pair of relatively rotating members spaced on a common axis having a first frictional engaging element fitted unrotatably and axially movably to one of said relatively rotating members, and a second frictional engaging element fitted unrotatably and axially movably to the other of said relatively rotating members, said clutch device comprising:

a variable length coupling means disposed on said common axis between said relatively rotating members and including a first cam member integrally fitted to said one of said pair of relatively rotating members and an axially movable second cam member and a cam roller disposed therebetween; and a piston means which selectively pushes said second cam member to cause a frictional engagement between said second cam member and said second frictional engaging element;

wherein:
said second cam member is arranged to be rotationally dragged by said other of said pair of relatively rotating members with said frictional engagement between said second cam member and said second frictional engaging element caused by said piston means; and
said first cam member and said second cam member respectively have opposing parallel slanted cam surfaces, of which a cam angle θ is chosen to satisfy tan θ>μ, where μ is a coefficient of friction between said second cam member and said second frictional engaging element, so that said cam roller is positioned between said slanted cam surfaces so as to increase a distance between said first cam member and said second cam member, and thereby said first frictional engaging element and said second frictional engaging element are engaged with a force which is proportional to a pushing force of said piston means when said second cam member is rotationally dragged.

9. A clutch device according to claim 8, wherein said piston means is incorporated with one of said cam members.

10. A clutch device according to claim 8, wherein said cam members are located outside of said piston means.

11. A clutch device according to claim 8, wherein said cam surface define V-shaped cam faces so that said relatively rotating members are coupled regardless of the direction of the relative rotation.

12. A clutch device according to claim 8, wherein said second cam member and a piston member of said piston means are integrally formed.

13. A clutch device according to claim 8, wherein said first cam member is located in an oil pressure chamber which comprises said piston means.

14. A clutch device according to claim 8, wherein said first cam member is located out of an oil pressure chamber which comprises said piston means.

15. A clutch device according to claim 8, wherein a bi-directional V-shaped cam surface is formed respectively on said cam surfaces of said first cam member and said second cam member.

* * * * *